United States Patent

Pappatheodoru

[15] 3,692,332
[45] Sept. 19, 1972

[54] VEHICLE DRAWN TRAILER SYSTEM

[72] Inventor: Angel Betancourt Pappatheodoru, Guanajuato 183-203, Mexico City, Mexico

[22] Filed: May 22, 1970

[21] Appl. No.: 39,747

[30] Foreign Application Priority Data

Jan. 19, 1970 Mexico...................116717

[52] U.S. Cl. ..........................280/423 R, 296/23 R
[51] Int. Cl. ...................................B62d 53/00
[58] Field of Search......280/423, 481, 446 B; 296/23

[56] References Cited

UNITED STATES PATENTS

| | | | |
|---|---|---|---|
| 3,383,119 | 5/1968 | Carroll | 280/423 X |
| 2,606,417 | 8/1952 | Richey | 280/481 X |
| 2,998,268 | 8/1961 | Witter | 280/446 B |

FOREIGN PATENTS OR APPLICATIONS

| | | | |
|---|---|---|---|
| 1,250,559 | 12/1960 | France | 280/423 |
| 811,601 | 4/1959 | Great Britain | 280/423 |
| 630,243 | 7/1963 | Belgium | 296/23 |

*Primary Examiner*—Leo Friaglia
*Attorney*—Burns, Doane, Swecker & Mathis

[57] ABSTRACT

A vehicle/trailer system wherein the shape of a trailer and the position at which the trailer is connected to a powered vehicle cooperate to allow unrestricted horizontal pivotal movement of the vehicle relative to the trailer when the two are connected together. A rigid hitch means, including a spherical member cooperable with a socket member, connectable to the roof portion of the vehicle along each side thereof is also disclosed.

6 Claims, 3 Drawing Figures

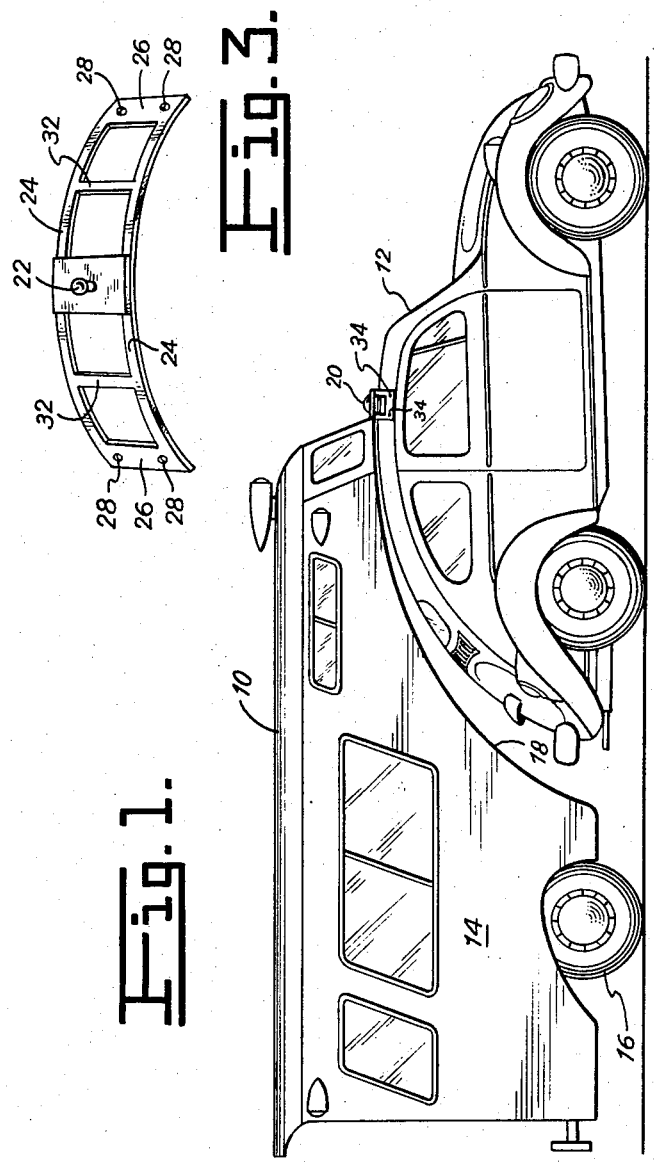

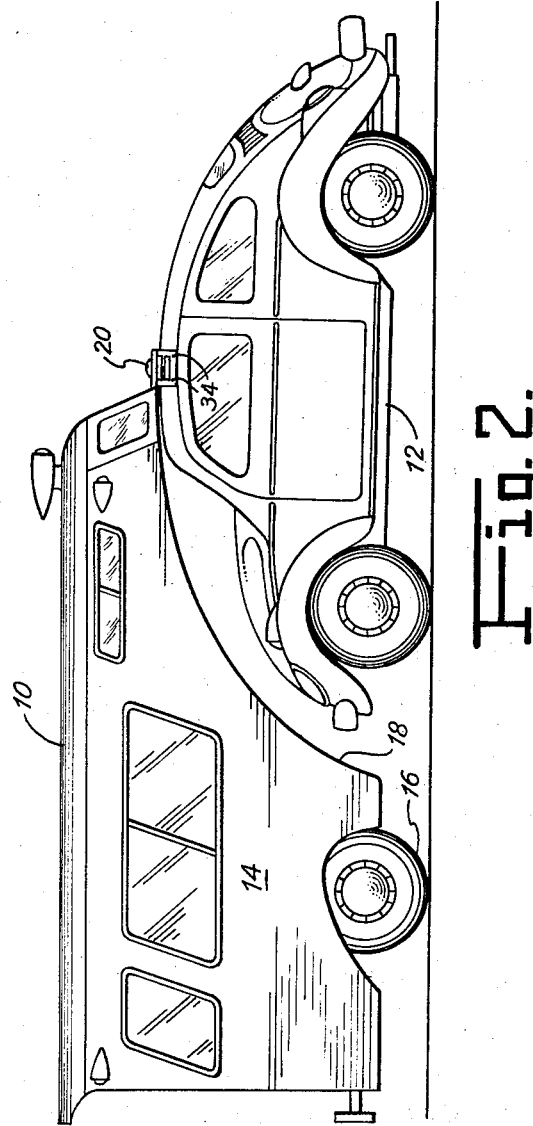

VEHICLE DRAWN TRAILER SYSTEM

BACKGROUND OF THE INVENTION

The present invention relates to power vehicle drawn trailer systems and more specifically to a novel vehicle/trailer system and coupling procedure particularly suited for automobile drawn camping trailers.

One prior art system for towing a trailer involves the use of a hitch which is connected to the bumper of a powered vehicle. Since this system is connected behind the rear suspension of the vehicle, the weight of the trailer is concentrated on the rear suspension, reducing the weight applied to the front wheels of the vehicle thereby reducing the steering stability of the vehicle. Additionally, the maneuverability of this type of system is seriously restricted by the shape of the trailer and the location of the coupling system.

Another prior art vehicle/trailer system involves the use of a trailer hitch which is connected to the roof of the vehicle, rather than the bumper. This type of connection may require an extremely complicated hitch which detracts from the appearance of the overall system and may pose problems with respect to maneuverability similar to those encountered with the more conventional bumper hitch. For example, both prior art systems require that the automobile be driven in reverse to both back the trailer and to align the vehicle and trailer for the purpose of coupling the trailer to the vehicle. In addition, the large turning radius of these prior art vehicle/trailer systems may restrict the degree of maneuverability thereof.

SUMMARY OF THE INVENTION

It is therefore an object of the present invention to provide a novel vehicle/trailer system which obviates these and other problems of the prior art.

It is another object of the present invention to provide a novel vehicle/trailer system which is extremely maneuverable.

It is yet another object of the present invention to provide a novel vehicle/trailer system including a trailer hitch means which is not complicated and which does not substantially detract from the aesthetic appearance of the vehicle.

It is still another object of the present invention to provide a novel vehicle/trailer system wherein the coupling between the vehicle and the trailer allows the vehicle to assume any angle relative to the trailer in a horizontal plane.

It is a further object of the present invention to provide a novel vehicle/trailer system wherein the trailer may be coupled to the vehicle by driving the vehicle forward into a position of alignment with the trailer, thereby eliminating the necessity of backing the vehicle.

These and other objects and advantages of the present invention are accomplished by connecting a trailer to a vehicle at a point near the approximate central vertical axis of the vehicle. The trailer is shaped to allow unrestricted horizontal pivotal movement of the vehicle relative thereto about a pivotal hitch connecting the trailer to the vehicle. The pivotal hitch connecting the trailer to the vehicle preferably includes a rigid support frame portion which extends transversely of the roof portion of the vehicle and is connected thereto along both sides of the roof portion. A spherical member is connected to a support plate portion which is carried by the support frame portion generally centrally thereof. The spherical member cooperates with a socket member carried by the trailer to effect the pivotal connection between the trailer and the vehicle.

THE DRAWINGS

FIGS. 1 and 2 are views in elevation of a trailer and a vehicle illustrating the principles of the present invention; and FIG. 3 is a pictorial view of a preferred embodiment of the vehicle mounted portion of the trailer hitch of the present invention.

DESCRIPTION OF THE PREFERRED EMBODIMENT

Referring to FIG. 1, a trailer 10 is shown connected to a vehicle 12, e.g. an automobile or other powered vehicle, in accordance with the principles of the present invention. The trailer 10 may include a body 14 carried above the ground by a pair of ground engaging wheels 16 in a suitable conventional manner. As illustrated, the body 14 is provided with a forward extending, upwardly contoured portion 18 shaped to receive at least the entire rear half of the vehicle 12 and the entire front half of the vehicle 12 when the trailer 10 and the vehicle 12 are in the relative positions illustrated in FIGS. 1 and 2, respectively, without contacting any portion of the vehicle 12 as will hereinafter be more fully described.

With continued reference to FIG. 1, a conventional trailer hitch socket 20 is preferably provided on the forwardmost portion of the trailer body 14, although the trailer body 14 may extend forward of the socket 20. The socket 20 engages a conventional ball type hitch 22 connected to the roof of the vehicle 12 as will hereinafter be described to provide pivotal coupling between the trailer 10 and the vehicle 12. The socket 20 is provided along the central longitudinal axis of the trailer 10 and the ball is provided approximately midway between the rearwardmost portion of the vehicle 12 and the forwardmost portion thereof along the central longitudinal axis of the vehicle 12. Thus, with the vehicle 12 in either of the positions illustrated in FIGS. 1 and 2, the longitudinal axes of the trailer 10 and the vehicle 12 are approximately coincident.

As previously described, the contoured portion 18 of the trailer body 14 is shaped such that no part of the body 14 contacts the vehicle 12 when the trailer 10 and the vehicle 12 are in the relative positions illustrated in FIGS. 1 and 2. Additionally, when the ball 22 is engaged by the socket 20 as previously described, the shape of the contoured portion 18 of the trailer 10 is such that the vehicle 12 may be pivoted about a substantially vertical axis running through the ball 22 throughout an entire 360° horizontal arc or circle without contacting the body 14 of the trailer 10.

Referring now to FIG. 3, the vehicle mounted portion of the trailer hitch of the present invention includes a pair of substantially coextensive, elongated members 24 of sufficient length to extend transversely across the roof of the vehicle as illustrated in FIG. 1. The members 24 may be curved as illustrated to conform to the shape of the roof of the vehicle 12. The adjacent ends of the elongated members 24 are connected together by a pair of flat, transverse members 26 attached thereto in a suitable conventional manner. Each of the transverse members 26 is provided with a pair of mounting holes 28 therethrough, spaced in conformance with similar holes through the roof of the vehicle 12 as will be later described.

The lower surface of a flat plate 30 is connected in a suitable manner between both of the elongated members 24 midway between the transverse members 26. The previously mentioned conventional ball type hitch 22 extends outwardly from the upper surface of the plate 30 substantially perpendicular to a plane tangent to the elongated members 24 near the midpoints thereof. In addition, cross braces 32 may be provided for additional rigidity.

In utilizing the trailer hitch, two holes are provided through each side of the roof of the vehicle 12 approximately midway between the rearwardmost and the forwardmost portions of the vehicle 12. The holes are positioned in alignment with the holes in the transverse members 26 of the trailer hitch so that conventional fasteners 34 such as bolts may be inserted through both the holes 28 in the transverse members 26 and the holes in the roof of the vehicle 12 to secure the trailer hitch to the vehicle.

Once the trailer hitch is connected to the vehicle 12, the vehicle 12 may be driven forward under the contoured portions 18 of the trailer 10 as illustrated in FIG. 2 and the socket 20 connected to the ball 22 in a conventional manner.

It is apparent from the above description that the trailer hauling system of the present invention provides several advantages over those of the prior art. For example, the trailer 10 is connected to the vehicle 12 at approximately the center thereof. Thus, any downward force exerted upon the vehicle 12 by the trailer 10 is applied approximately equally to all four wheels of the vehicle 12.

Further, since the vehicle 12 may be maneuvered at any angle throughout 360° relative to the trailer 10 without contact therebetween, the trailer 10 is extremely maneuverable. For example, when backing the trailer 10 the vehicle may be positioned as illustrated in FIG. 2 to facilitate this operation. Additionally, when hitching the trailer to the vehicle 12, the vehicle 12 may be driven forward beneath the contoured surface 18 of the trailer 10 rather than backward as required in the past. It is apparent that this feature greatly facilitates the hitching of the trailer 10 to the vehicle 12. A still further advantage of the system of the present invention is the ease with which the trailer 10 may be turned around within a very narrow space without disconnecting the trailer 10 from the vehicle 12. Additional advantages such as lower wind resistance, maximum interior trailer space for a given overall trailer and vehicle length and both simple and aesthetically appealing design are also apparent from the drawings and the above description thereof.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. Apparatus comprising:
 a. a powered vehicle;
 b. a trailer;
 c. hitch means connected to said vehicle for providing a substantially vertical pivot axis on said vehicle approximately midway between the forwardmost extending and the rearwardmost extending portions of said vehicle, said hitch means including:
  1. two substantially coextensive elongated members;
  2. transverse members connected at both ends of said elongated members between the adjacent ends thereof;
  3. said transverse members each having a plurality of apertures therethrough, the axes of the apertures being substantially perpendicular to a plane tangent to both of said elongated members;
  4. a substantially flat plate extending between said elongated members and connected thereto approximately midway between said transverse members; and
  5. a generally spherical member connected to said plate and extending outwardly therefrom approximately perpendicular to said plane;
 d. connecting means carried by said trailer for engaging said hitch means, said connecting means cooperating with said hitch means to permit pivotal movement between said vehicle and said trailer about said pivot axis in a horizontal plane; and
 e. said trailer including vehicle receiving means shaped to allow unrestricted pivotal movement between said vehicle and said trailer in the horizontal plane while said hitch means is engaged by said connecting means.

2. The apparatus of claim 1 wherein said vehicle receiving means comprises a generally curved, forwardly and upwardly extending trailer portion.

3. The apparatus of claim 1 wherein said hitch means comprises a generally spherical member carried by a support frame.

4. The apparatus of claim 1 wherein said connecting means comprises a socket adapted to engage said spherical member.

5. Apparatus comprising:
 a. a powered vehicle having a roof portion;
 b. a trailer having a generally horizontal bottom surface and a contoured portion defining an enclosed space extending outwardly and upwardly from said bottom surface, said enclosed space overlying at least a portion of the roof portion of said vehicle;
 c. a generally spherical member carried by hitch means extending transversely of the roof portion of said vehicle, said hitch means including:
  1. a rigid, generally rectangularly shaped support frame portion extending transversely of the roof portion of said vehicle, said support frame portion defining a lower surface generally conforming to the curvature of the roof portion of said vehicle;

2. a substantially flat, spherical member support plate portion rigidly carried by said support frame portion generally centrally thereof and in a generally horizontal attitude, said spherical member being connected to the upper surface of said support plate portion generally centrally thereof and extending outwardly from said support plate portion generally perpendicularly thereto; and,
3. connecting means disposed adjacent the corners of said support frame portion for securely connecting said support frame portion to both sides of the roof portion of said vehicle at two positions spaced along each side of the roof portion; and,
d. a socket member carried by said trailer adjacent the outwardmost extension of the contoured portion thereof,
1. said socket member cooperating with said spherical member to provide a pivotal connection between said vehicle and said trailer;
2. the contoured portion of said trailer being shaped to allow at least a portion of said vehicle to pass under the enclosed space as said vehicle is pivoted relative to said trailer in a horizontal plane, said vehicle thereby being pivoted through 360° in a horizontal place relative to said trailer while connected thereto.

6. Apparatus comprising:
a. a powered vehicle having a roof portion;
b. a trailer having a generally horizontal bottom surface and a contoured portion defining an enclosed space extending outwardly and upwardly from said bottom surface, said enclosed space overlying at least a portion of the roof portion of said vehicle;
c. hitch means including:
1. a generally spherical member;
2. a rigid support frame portion extending transversely of the roof portion of said vehicle said support frame portion defining a lower surface generally conforming to the curvature of the roof portion of said vehicle;
3. a substantially flat support plate portion rigidly carried by said support frame portion generally centrally thereof and in a generally horizontal attitude, said spherical member being connected to the upper surface of said support plate portion generally centrally thereof and extending upwardly therefrom;
4. elongated connecting portions extending along each side of the roof portion of said vehicle generally parallel to the longitudinal axis of said vehicle, said connecting portions having apertures therethrough at at least positions spaced therealong;
5. threaded fastener means cooperable with said apertures for securely fastening said hitch means to the roof portion of said vehicle at at least two spaced positions along each side of the roof portion; and,
d. a socket member carried by said trailer adjacent the outwardmost extension of the contoured portion thereof,
1. said socket member cooperating with said spherical member to provide a pivotal connection between said vehicle and said trailer;
2. the contoured portion of said trailer being shaped to allow at least a portion of said vehicle to pass under the enclosed space as said vehicle is pivoted relative to said trailer in a horizontal plane, said vehicle being pivoted through 360° in a horizontal place relative to said trailer while connected thereto.

* * * * *